United States Patent [19]

Grose

[11] Patent Number: 4,687,575

[45] Date of Patent: Aug. 18, 1987

[54] AQUARIUM FILTERING SYSTEM

[76] Inventor: Ronald D. Grose, 4432 Pine, Omaha, Nebr. 68105

[21] Appl. No.: 837,698

[22] Filed: Mar. 10, 1986

[51] Int. Cl.$^4$ .............................................. A01K 63/04
[52] U.S. Cl. ................................. 210/169; 210/416.2; 119/5
[58] Field of Search ............... 210/169, 196, 291, 304, 210/416.2; 119/5

[56] References Cited

U.S. PATENT DOCUMENTS

| 2,594,474 | 4/1952 | McGrath | 210/196 |
| 4,151,810 | 5/1979 | Wiggins | 119/5 |
| 4,156,401 | 5/1979 | Ogui | 119/5 |
| 4,333,829 | 6/1982 | Walther | 210/169 |

FOREIGN PATENT DOCUMENTS 2413352 10/1975 Fed. Rep. of Germany .

OTHER PUBLICATIONS

Author: George Smith, Marine Aquariums, Jan. 1986 Issue of Fresh Water and Marine Aquarium, pp. 35-42 and 84-85.

Primary Examiner—Richard V. Fisher
Assistant Examiner—Linda S. Evans
Attorney, Agent, or Firm—Zarley, McKee, Thomte, Voorhees & Sease

[57] ABSTRACT

An aquarium filtration system includes an assembly of coaxial tubes within an aquarium which draws water through the conventional under-gravel filtration system of the aquarium, and communicates the initially filtered water to a fine-sand filter assembly located in a separate tank below the aquarium. The filtered water in the lower tank is then pumped upwards through the innermost tube of the coaxial tube assembly and returned to the aquarium. A water conduit, which surrounds the water supply tube, extends upwards to the desired water level of the aquarium, and conduit is axially adjustable to vary the water level. A casing surrounding the water conduit has an open bottom and allows water from the under-gravel filtration system to pass upwardly to the top of the water conduit, where it is drained to the filter assembly in the lower tank.

9 Claims, 5 Drawing Figures

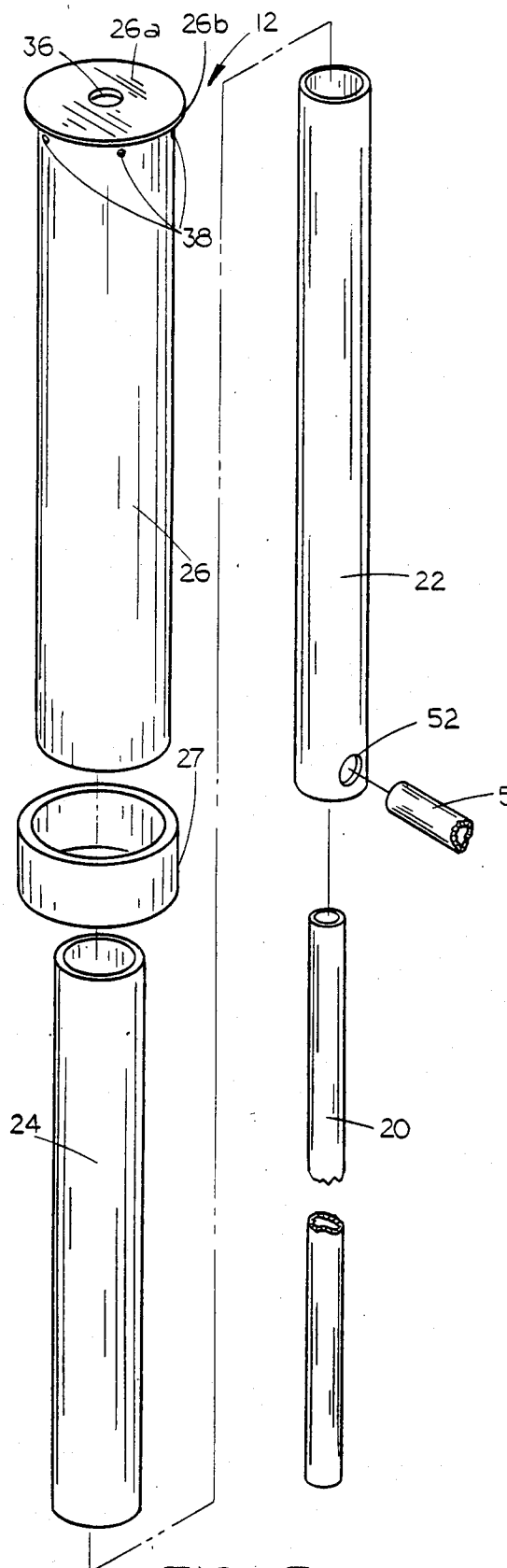
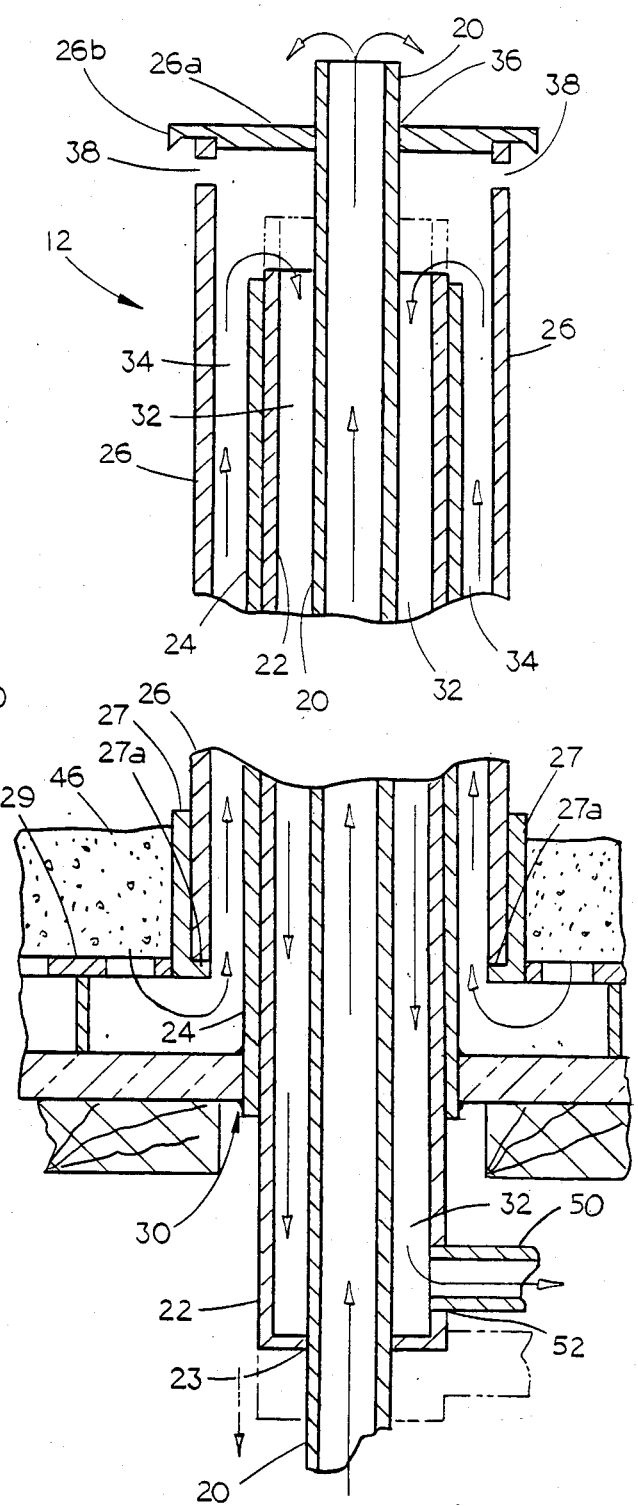
FIG. 3
FIG. 4

4,687,575

AQUARIUM FILTERING SYSTEM

BACKGROUND OF THE INVENTION

This invention relates generally to fltering systems for aquariums and more particularly to an improved dual filter system utilizing particulate filter material.

Most aquariums require some sort of water quality control in order to maintain an environment suitable for fish. For those who do not have the time or desire to maintain an "ecologically balanced" aquarium (where water conditions are maintained strictly biologically) an active water quality control system is necessary. Such water quality control systems typically include one or more of the following: Direct water filtration, under-gravel filtration, aeration and/or chemical control. Direct water filtration usually takes the form of a mechanical filter utilizing glass wool or porous urethane foam through which water is passed. Such filters quickly become clogged since biological degradation action is minimal, and frequent cleaning or replacement is therefore necessary. Under-gravel filtration is the most popular method, but, when used alone, and/or with low pressure ratio pumps typically used in most aquarium set-ups, requires frequent cleaning of the gravel—a time consuming and typically messy task. Aerators have also been used as a means for water clarification, but are easily clogged because of the low pressure supplied by the air pumps utilized. All of the known systems conventionally use tubes or electric cords which must pass over the top and outside of the tank in order to operate the various devices.

It is, therefore, a principal object of the invention to provide a novel aquarium filtration system.

Yet another object of the invention is to provide an integrated filtration system which does not require unsightly tubes which pass over the top of the tank.

Still another object of the invention is to provide a filtering system which does not require siphoning action.

Yet another object of the invention is to provide a filtering system which also aerates the water.

Still another object of the invention is to provide a filtration system which is easily maintained and is readily accessible, even while operating.

Another object is to provide a filtering system which substantially elimnated the need to drain the aquarium or clear the aquaruim gravel.

These and other objects will be apparent to those skilled in the art.

BRIEF DESCRIPTION OF THE DRAWINGS

FIG. 3 is an exploded view of that portion of the invention which is inserted within the aquarium;

FIG. 4 is an enlarged sectional view of the portion of the invention shown in FIG. 3.

SUMMARY OF THE INVENTION

An aquarium filtration system is provided which includes an assembly of coaxial tubes within an aquarium which draws water through a modified conventional under-gravel filtration system, and communicates the initially filtered water to a fine-sand filter assembly located in a separate tank below the aquarium. The fine-sand filtration system utilizes a holding container which sprays water over fine sand, the filtered water then collecting within the tank. The filtered water in then pumped upwards through the innermost tube of the coaxial tube assembly and returned to the aquarium. A water conduit, which surrounds the water supply tube, extends upwardly to the desired water level of the aquarium, and is axially adjustable to vary the water level. A casing surrounding the water conduit has an open bottom and allows water from the under-gravel filtration system to pass upwardly to the top of the water conduit. In operation, water filters down through the gravel of the aquarium, then up around the water conduit within the casing, and then down through the water conduit to the fine-sand filter system, to then be recirculated back to the aquarium.

DESCRIPTION OF THE PREFERRED EMBODIMENT

Figure 1:
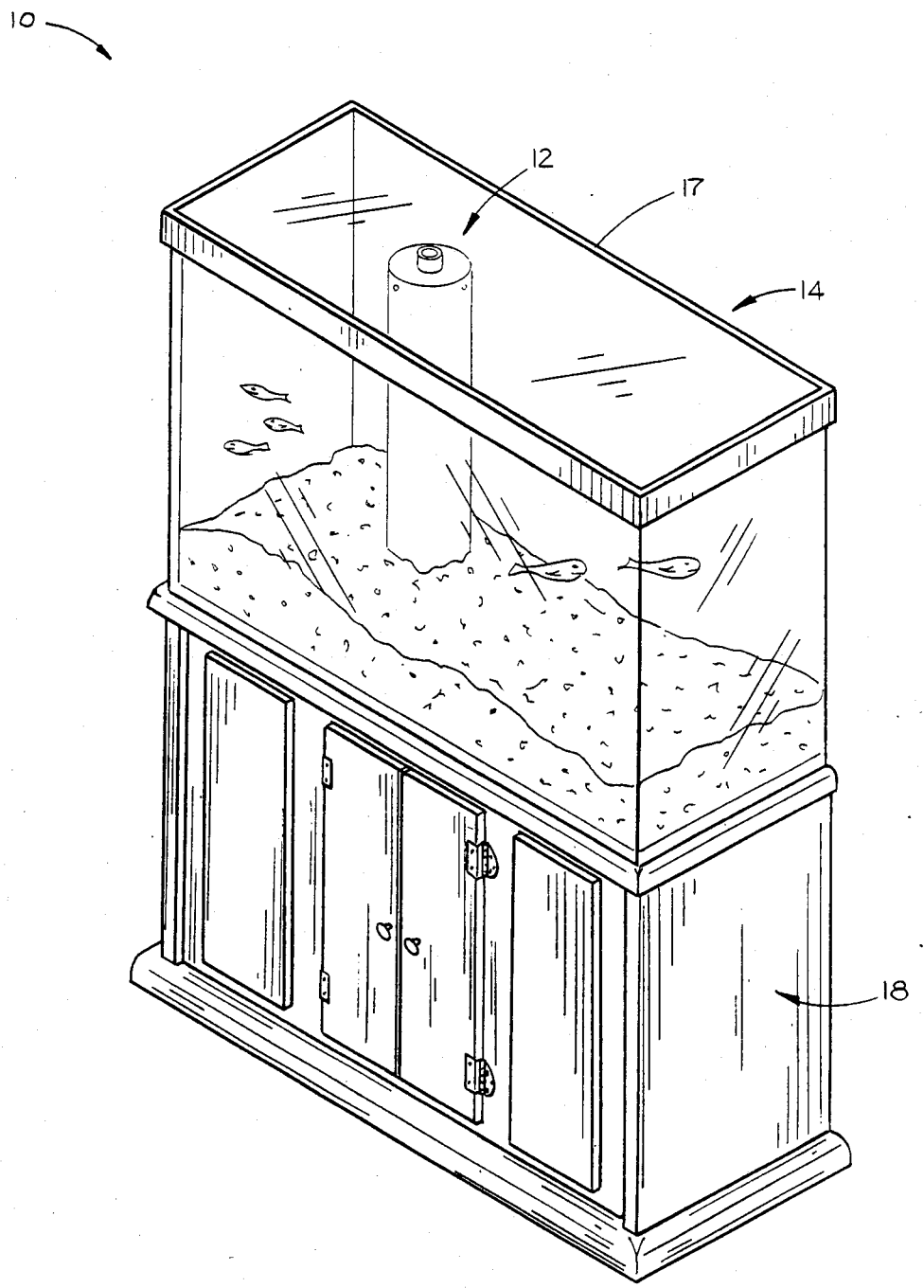
FIG. 1 is a perspective view of the invention in operation.

The filtration system is designated generally at 10 and includes a coaxial tube assembly 12 extending upward from the bottom of an upper tank 14, and a lower filter tank assembly 16 located within a cabinet 18 (shown in FIG. 1) upon which upper tank 14 rests. Since this invention eliminates the necessity for tubes or electric cords to pass over the top edge of the upper tank 14, a cover 17 may be extended completely across the top of tank 14.

Figure 2:
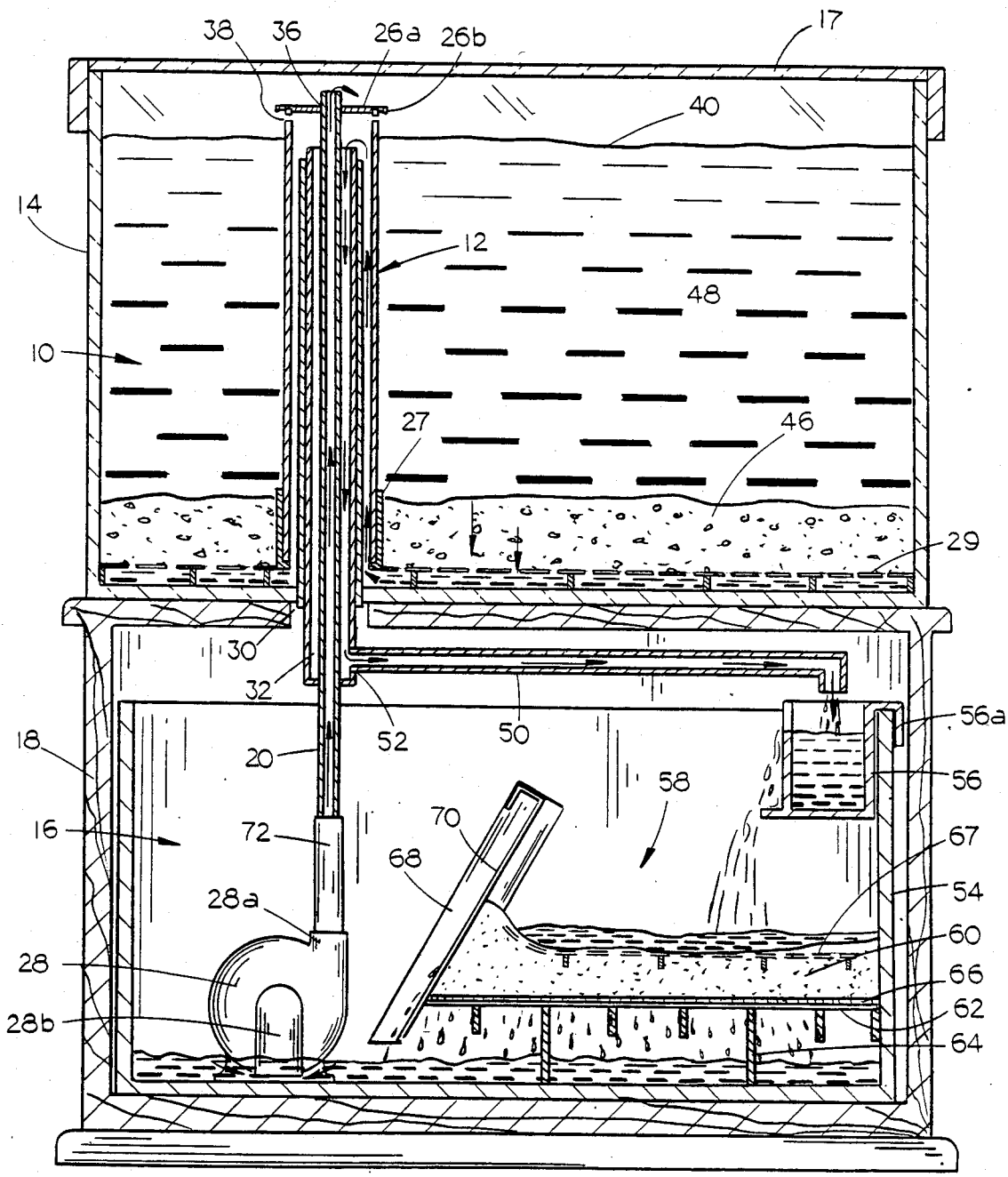
FIG. 2 is a front sectional view of the invention.

Referring now to FIGS. 2, 3 and 4, it can be seen that coaxial tube assembly 12 includes five separate tube components: a clean water supply tube 20; a larger diameter water conduit 22 which is axially slidable within a sleeve 24; and a cylindrical outer casing 26 mounted within a collar 27. The clean water supply tube 20 is the innermost tube of coaxial tube assembly 12. Tube 20 is connected at its lower end to the outlet port 28a of a water pump 28 and extends vertically upward through an aperture 30 in the floor of upper tank 14. Tube 20 extends nearly to the top of upper tank 14, and supplies clean filtered water to the aquarium.

Water conduit 22 is closed at its lower end, and has an aperture 23 through which water supply tube 20 is slidably journaled. Conduit 22 has an interior diameter larger than tube 20, such that an annular passage 32 is formed around tube 20. Conduit 22 is slidably journaled through sleeve 24 for up and down movement.

Sleeve 24 has an exterior diameter substantially equal to the diameter of aperture 30 in upper tank 14, and extends therethrough upwardly into upper tank 14. Sleeve 24 is sealed against the floor of upper tank 14 and slidably contains conduit 22.

Casing 26 has an inside diameter larger than the outside diameter of sleeve 24, such that an annular passage 34 is formed around sleeve 24. A top 26a on the upper end of casing 26 extends outwardly beyond the outside diameter of casing 26, and has a lip 26b depending from its circumference. Water supply tube 20 extends through an aperture 36 in top 26a, and expels filtered water into upper tank 14.

Ports 38 are located in the wall of casing 26 adjacent its top and above the desired water level (designated at 40) in the aquarium. The purpose of ports 38 will be discussed in more detail below. The lower end of casing 26 is slidably journaled within collar 27, which is mounted to a conventional gravel support member 29. An interiorly directed lip 27a on the lower end of sleeve 27 holds casing 26 above the bottom of tank 14 such that water filtered through under-gravel support member 29 may enter annular passage 34.

Referring specifically to FIG. 2, it can be seen that conventional gravel support member 29 covers the floor of upper tank 14 and supports gravel 46, yet allows water 48 to flow therethrough. The bottom of casing 26 is open and communicates with the water under gravel support member 29 thereby allowing the water to flow upward in passage 34 within casing 26. This arrangement allows gravel 46 to act as an initial filtering system before entering coaxial tube assembly 12.

The slidable movement of conduit 22 within sleeve 24 allows the water level in upper tank 14 to be adjusted. As conduit 22 is lowered, the water outside casing 26 will flow into passage 34 of casing 26 and then into annular passage 32. Thus, pumping of clean water out of the top of tube 20 into upper tank 14 will raise water level 40, thereby causing the flow of water to continue within casing 26, draining upper tank 14, as long as water is being pumped. If conduit 22 is raised, the water level 40 in the tank will raise, so long as the pump continues to supply water, until it again begins to flow into water conduit 22.

Ports 38 prevent siphoning action from occurring by equalizing the air pressure between the interior and exterior of casing 26. Siphon action would drain water from upper tank 14 without regard to the height of conduit 22 or the water level 40, and without regard to the rate at which water was being pumped into upper tank 14. This invention, therefore, allows the upper tank 14 to be drained only to the desired water level, due to the axial mobility of water conduit 22 and the prevention of siphoning by ports 38.

The lower tank filter assembly 16 of filtration system 10, includes a lower tank 54 with an open top, a holding container 56 mounted on one side of tank 54, a filter assembly 58 located below holding container 56, and water pump 28. A lateral drain pipe 50 is slip fitted within an aperture 52 located in the wall of conduit 22 adjacent its lower end, and empties into holding container 56.

Figure 5:
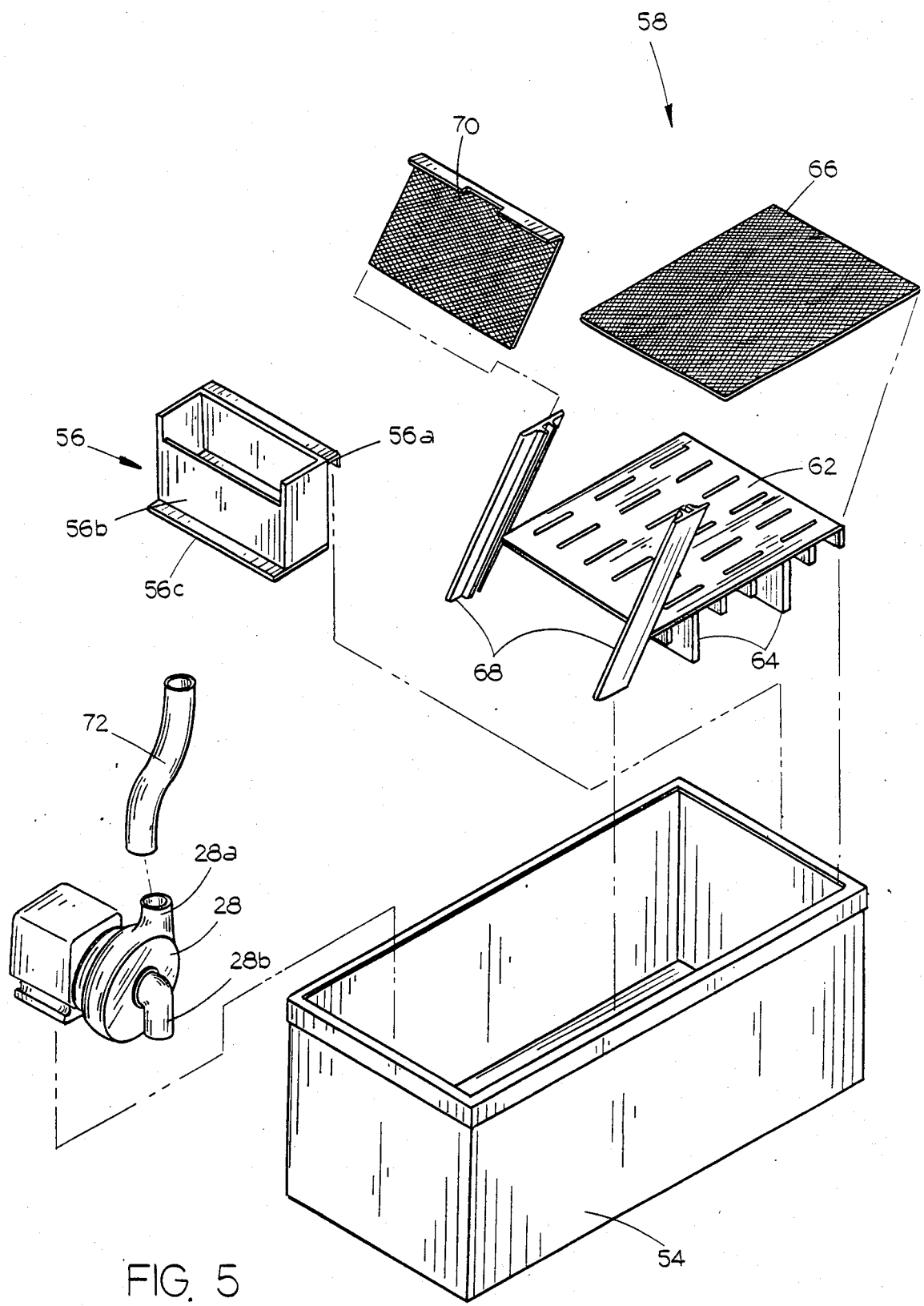
FIG. 5 is an exploded view of the lower tank assembly of the filtration system of the invention.

Referring now to FIGS. 2 and 5, holding container 56 has a lip 56a which fits over one side of lower tank 54 to hold container 56 over filter assembly 58. A front wall 56b on container 56 is lower than the remaining walls of the container, so that water will pour over only one side. A projecting ledge 56c along the bottom of container 56 directly under wall 56b causes water to splash and thereby be sprayed more evenly over filter assembly 58. In this manner, a more uniform distribution of water over the fine sand will occur, and the fine sand 60 will not be washed aside by a stream of pouring water. Water heaters (not shown) may be added to holding container 56 to warm the water for use in the aquarium.

Filter assembly 58 includes a modified under gravel support member 62 on legs 64, which supports a fine mesh horizontal screen 66 and which extends to opposing walls of lower tank 54. Fine sand 60, supported on screen 66, filters water by biological degradation activity caused by bacteria attaching themselves to the surfaces of the sand grains. A splash guard 67, which consists of another modified under gravel support member cut to the appropriate size, protects the fine sand 60 from being forced through screen 66 by the pressure of pouring water.

A pair of brackets 68 hold a second fine mesh screen 70, attached to support member 62, in a generally vertical orientation, tilted slightly back towards the holding container 56 to hold in sand 60. Thus, water is filtered through the fine sand 60 and collects on the bottom of lower tank 54 under filter assembly 58.

Water pump 28 has an inlet port 28b located adjacent the floor of lower tank 54 and pumps the water through outlet port 28a into tube 20 via an adapter tube 72.

In operation, clean water within lower tank 54 is pumped through water supply tube 20 into upper tank 14. As the water level 40 is raised within upper tank 14, the water level will also raise within annular passage 34 of coaxial tube assembly 12. Once water spills into annular passage 32 of conduit 22 circulation of water is created through gravel 46 into the bottom of casing 26, then through passage 34 and into passage 32. The water then passes through drain pipe 50 in the lower filter tank assembly 16 and is emptied into holding container 56.

Once the water level within holding container 56 reaches the height of its front wall 56b, water will spill over onto ledge 56c and spray onto the splash guard 67 of filter assembly 58. The water then drains through the apertures in splash guard 67 and will percolate through fine sand 60. It will then pass through the fine mesh screens 66 or 70 to be collected in the bottom of tank 54 for recirculation through this system once again.

Thus, it can be seen that a novel filter system has been provided which utilizes the existing gravel system of the aquarium in conjunction with the biological action of an additional fine sand system in order to doubly filter the water. No tubes are required to pass over the top and outside of the aquarium in an unsightly manner, the only visible portion of the filtration system being the exterior of the coaxial tube assembly. More important, the fine-sand filter may be easily cleaned or replaced without draining the aquarium, and, therefore, the gravel and the aquarium itself are rarely required to be cleaned. Because of biological degradation activity, even the fine sand filter requires only infrequent attention.

Thus, it can be seen that a novel filtration system has been provided which accomplishes at least all of its stated objectives.

I claim:
1. An aquarium filter system, comprising:
   a lower tank means having a particulate filter material therein adapted to filter water supplied thereto;
   an upper tank means positioned above said lower tank means and having particulate filter material therein adapted to filter water supplied thereto;
   a water pump means in said lower tank and having intake and outlet ports, said water pump means having its intake port in fluid communication with water filtered through the particulate filter material in said lower tank;
   a vertically disposed water supply tube communicating between the outlet port of said water pump means and said upper tank whereby water filtered in said lower tank is supplied to said upper tank;
   a vertically disposed water conduit means having its upper end in fluid communication with water filtered through the particulate filter material in said upper tank, and its lower end in operative communication with said lower tank to supply water to the particulate filter material therein; and
   said water conduit means including selectively adjustable water level regulating means adapted to constantly maintain a selected water level;

whereby water filtered in the upper tank is communicated to the lower tank, filtered, and pumped back into the upper tank.

2. The aquarium filter system of claim 1, wherein said water level regulating means includes antisiphoning means.

3. An aquarium filter system, comprising:
a lower tank means having a particulate filter material therein adapted to filter water supplied thereto;
an upper tank means positioned above said lower tank means and having particulate filter material therein adapted to filter water supplied thereto;
a water pump means in said lower tank and having intake and outlet ports, said water pump means having its intake port in fluid communication with water filtered through the particulate filter material in said lower tank;
a vertically disposed water supply tube communicating between the outlet port of said water pump means and said upper tank whereby water filtered in said lower tank is supplied to said upper tank;
a vertically disposed water conduit means having its upper end in fluid communication with water filtered through the particulate filter material in said upper tank, and its lower end in operative communication with said lower tank to supply water to the particulate filter material therein;
said water conduit means including selectively adjustable water level regulating means adapted to constantly maintain a selected water level; and
said water conduit means being in fluid communication with surrounding air above the selected water level of said upper tank, said communication with the surrounding air adapted to eliminate siphoning;
whereby water filtered in the upper tank is communicated to the lower tank, filtered, and pumped back into the upper tank.

4. An aquarium filter system comprising:
a lower tank means having a particulate filter material therein adapted to filter water supplied thereto;
an upper tank means positioned above said lower tank means and having particulate filter material therein;
a water pump means in said lower tank and having intake and outlet ports, said water pump means having its intake port in fluid communication with water filtered through the particulate filter material in said lower tank;
a vertically disposed water supply tube communicating between the outlet port of said water pump means and said upper tank whereby water filtered in said lower tank is supplied to said upper tank;
a vertically disposed water conduit means having its upper end in fluid communication with water filtered through the particulate filter material in said upper tank, and its lower end in operative communication with said lower tank to supply water to the particulate filter material therein;
said upper tank having support means for supporting said particulate filter material above the bottom of said tank, said support means adapted to permit water to flow therethrough;
a hollow tube-like casing resting on said particulate filter material support means in said upper tank, said casing having its lower end in fluid communication with water filtered through the particulate filter material in said upper tank;
said casing surrounding said water conduit means and extending beyond the upper end of said water conduit means;
said casing having an inside diameter adapted to form an annular passage around said water conduit means, the passage communicating between the lower end of said casing and the upper end of said water conduit means, whereby water filtered through said particulate filter material in said upper tank will flow through the lower end of said casing, up the annular passage and into the water conduit means when the water level outside the casing is higher than the upper end of the water conduit means;
and means for selectively adjusting said water conduit means vertically, such that lowering the water conduit means will lower the water level outside said casing by draining it through said water conduit means; and
whereby water filtered in the upper tank is communicated to the lower tank, filtered, and pumped back into the upper tank.

5. The aquarium filter system of claim 4, wherein the particulate filter material in the upper tank is conventional aquarium gravel, and the particulate filter material in the lower tank is fine sand.

6. The aquarium filter system of claim 4, wherein said upper tank has means defining an aperture formed in its bottom and wherein said water supply tube and water conduit means project through said aperture.

7. The aquarium filter system of claim 4,
wherein said upper tank has means defining an aperture formed in its bottom, and wherein said water conduit means projects through said aperture;
wherein said water supply tube enters said water conduit means below the upper tank, passes therethrough coaxial therewith, and projects out the upper end thereof;
wherein said casing has a closed top with means defining an aperture therein through which the upper end of said water supply tube projects;
wherein said casing has a port in its wall near the upper end thereof for the passage of air, said port being located above the upper end of said water conduit means; and
wherein said water conduit means has an inside diameter adapted to form an annular passage around said water supply tube for the passage of water therethrough.

8. The aquarium filter system of claim 7, further comprising a sleeve surrounding said water conduit means, said sleeve being mounted at its lower end within said aperture in the bottom of said upper tank, and extending upwards therefrom, said sleeves adapted to stablize said water conduit means when said water conduit means is vertically adjusted.

9. The aquarium filter system of claim 4, further comprising:
a container attached to said lower tank for holding water above said particulate filter material in said lower tank, said container being open-topped and having one short sidewall over which water will overflow;
wherein the lower end of said water conduit means communicates with the open top of the container, to supply water thereto; and
wherein said container has a projecting ledge located under said short sidewall and mounted such that water overflowing from the container impacts upon the ledge and sprays onto said particulate filter material in said lower tank.

* * * * *